Jan. 2, 1940.   N. E. WAHLBERG   2,185,486
AIR CONDITIONING SYSTEM FOR AUTOMOBILES
Filed May 14, 1937   2 Sheets-Sheet 1
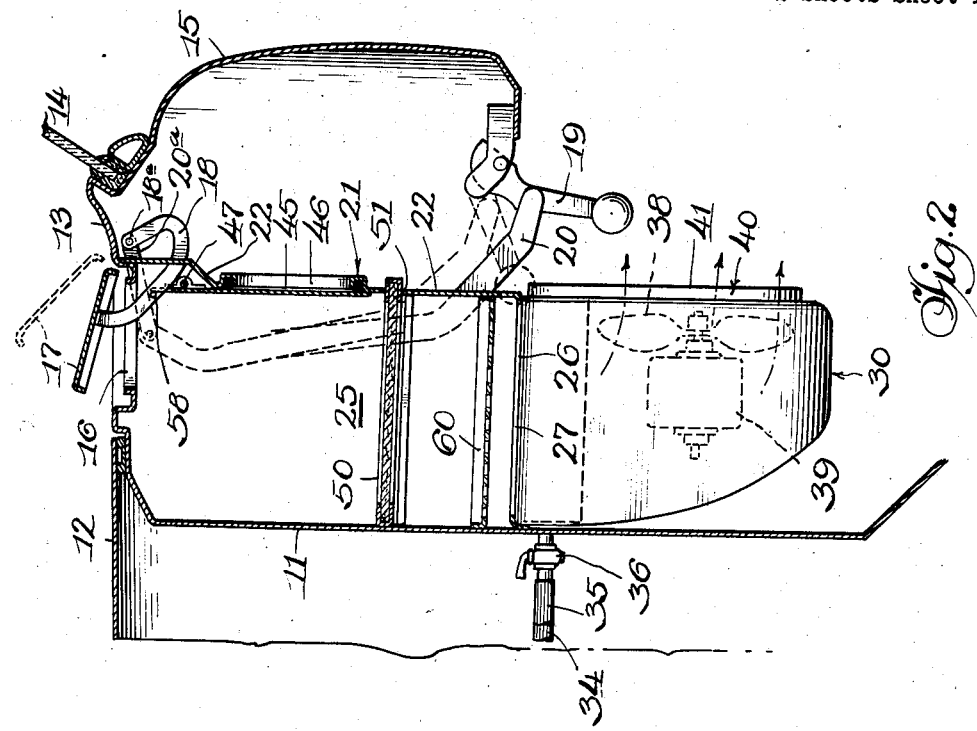
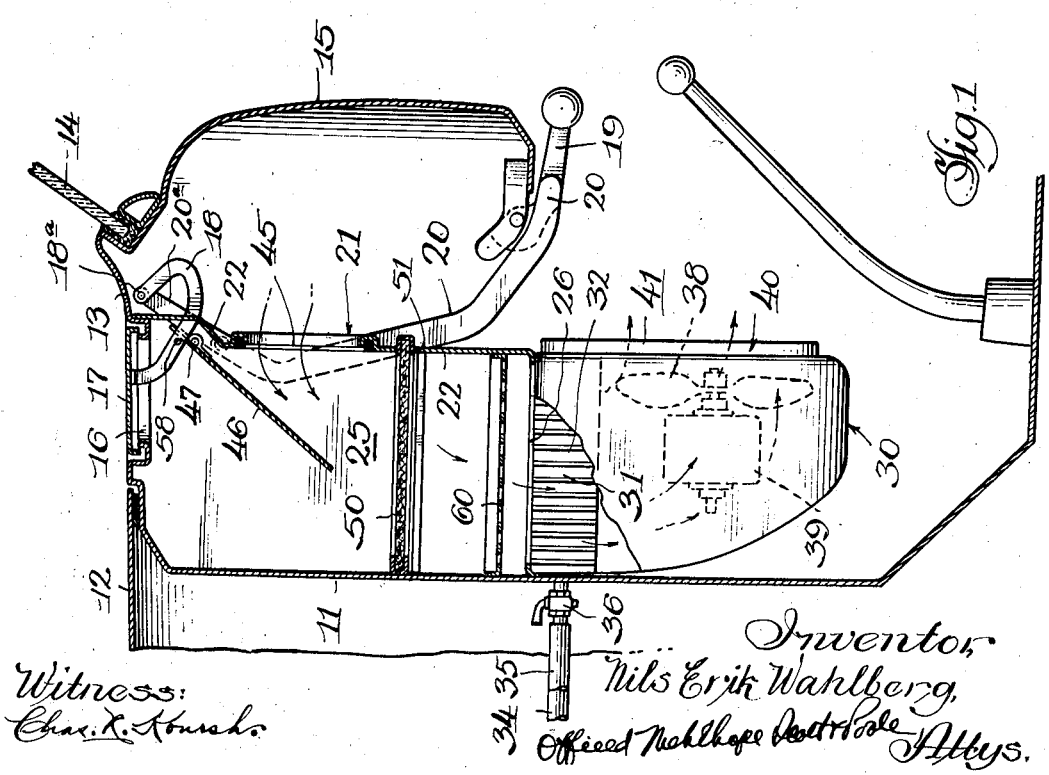

Jan. 2, 1940. N. E. WAHLBERG 2,185,486
AIR CONDITIONING SYSTEM FOR AUTOMOBILES
Filed May 14, 1937 2 Sheets-Sheet 2
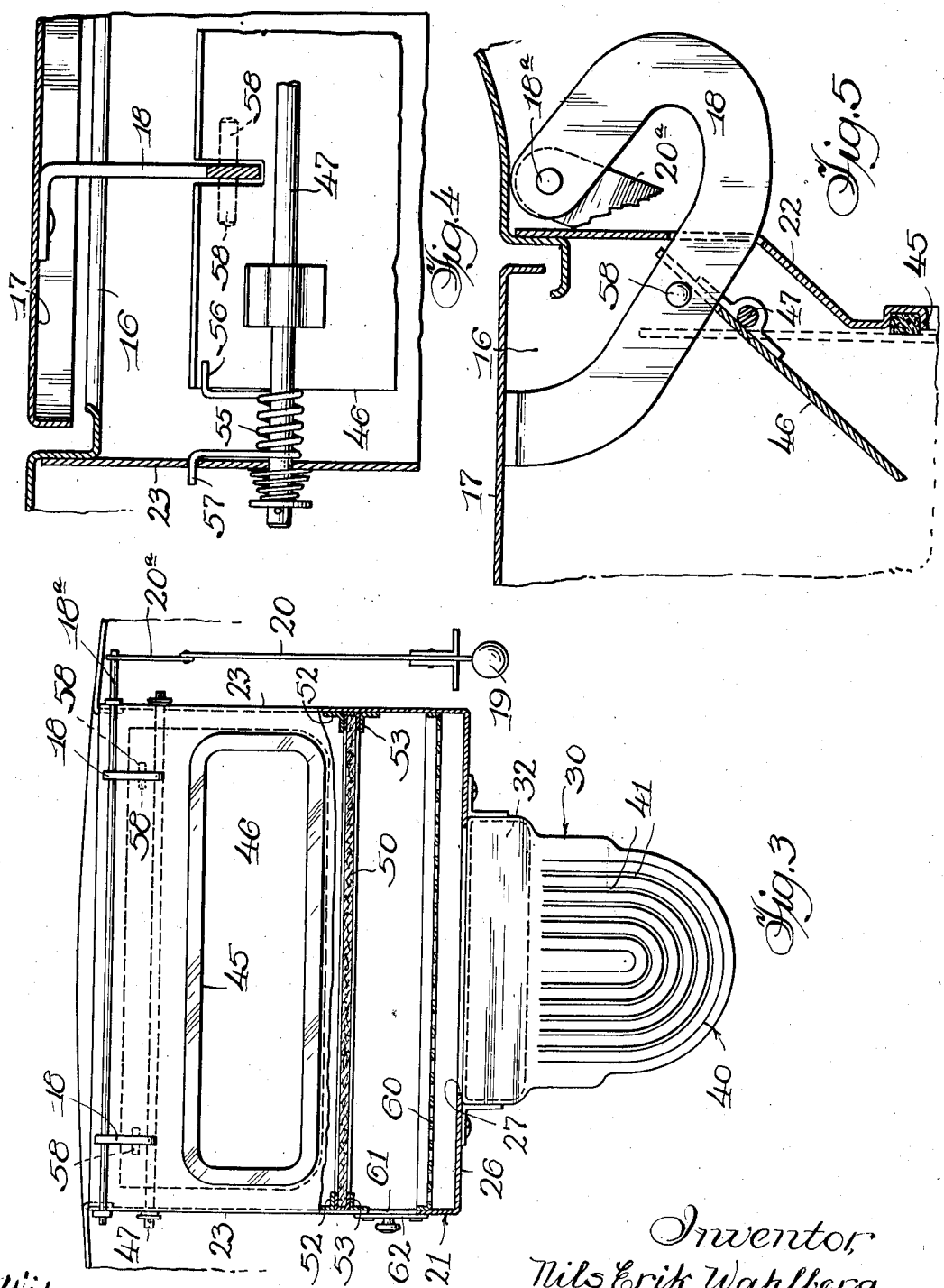

UNITED STATES PATENT OFFICE 2,185,486

AIR CONDITIONING SYSTEM FOR AUTOMOBILES

Nils Erik Wahlberg, Kenosha, Wis., assignor to Nash-Kelvinator Corporation, Kenosha, Wis., a corporation of Maryland Application May 14, 1937, Serial No. 142,618

4 Claims. (Cl. 98—2)

This invention relates to improvements in air conditioning systems for automobiles, and has for its principal object to provide a simple and efficient all-season ventilating system capable of being used for heating under winter driving conditions or for cooling under summer driving conditions, and including air filtering means insuring a dust-free air supply for the passenger compartment at all times.

In carrying out my invention, I provide a ventilating system adjustable at will to re-circulate, heat and filter the air within the car body for driving under winter conditions, to artificially cool the re-circulated air under extreme summer temperatures, or provide a cool supply of filtered air from the outside when operating under ordinary summer conditions, either by introducing cooler outer air directly into the car body, or by artificially cooling such outer air before it is introduced into the car body.

Other objects and advantages of my invention will appear from time to time as the following description proceeds.

The invention may best be understood by reference to the accompanying drawings, in which Fig. 1 is a fragmentary side view of the dashboard and associated parts of an automobile of conventional form to which my invention has been applied, and showing the parts primarily arranged for winter driving condition.

Fig. 2 is a view similar to Fig. 1, but showing the parts arranged primarily for summer driving condition.

Fig. 3 is a rear view of the apparatus shown in the preceding figures, but with the instrument board removed and other parts of the apparatus broken away to show certain details of construction thereof.

Fig. 4 is an enlarged detail section showing parts of the cowl ventilator and damper control mechanism.

Fig. 5 is an enlarged detail of the parts shown in Fig. 4 viewed in longitudinal section.

Referring now to details of the ventilating system shown in the drawings, the principal parts of an automobile to which my invention is applied consist of a dashboard 11, hood 12, cowl 13, windshield 14, and instrument board 15, all arranged in the conventional manner, with the instrument board spaced rearwardly of the dashboard as shown. The cowl has the usual ventilator opening 16 and ventilator cover plate 17 therefor mounted on hinges 18 pivoted on cross rod 18ª and controlled from the driver's seat by a hand lever 19 mounted on the instrument board 15 and operatively connected to said cowl ventilator plate by a link 20 and arm 20ª.

An inlet casing indicated generally at 21 is located below the cowl 13, consisting of a generally upright partition 22 and side plates 23, 23 which, together with the dashboard 11, form a downwardly extending air inlet passage 25.

At the bottom of said inlet casing is mounted a hot water heater indicated generally at 30 which herein is of conventional form consisting of a housing 31 suspended from the bottom wall 26 of the inlet casing 25 and having a hot water radiator or core 32 therein immediately below the opening 27 in the bottom wall of the inlet casing as clearly shown in Figs. 1 and 2. Hot water from the engine cooling system is supplied as usual through pipes 34 and 35 having a shut-off valve 36 therein. Said heater is also provided with forced draft ventilating means which herein consists of an air fan 38 driven by an electric motor 39 having connection as usual with the electric current supply of the car. Said heater is preferably arranged so as to direct the air in a generally horizontal rearward direction, but as shown in Fig. 3 the discharge passage 40 of said heater is provided with a plurality of louvres 41, 41 disposed at inclined angles so as to disperse or spread the air column downwardly and laterally as the air is discharged into the vehicle body.

In the upper part of the partition 22 of the inlet casing 21 I provide an opening 45 preferably extending substantially the full width of said casing. A damper valve or plate 46 is mounted within the casing, as herein shown being hinged on a rod 47 above the opening 45 and arranged to close the opening 45 when in the position shown in Fig. 2, but under winter driving conditions as shown in Fig. 1, said damper is swung to open position, as will hereinafter more fully appear.

In connection with the inlet casing 21 I also provide means for filtering the air before it is discharged through the heater element 30. In the form shown, this filter consists of a filter plate 50 disposed horizontally across the lower end of the inlet casing, but spaced substantially above its bottom wall 26 as shown. Said filter plate may be of any suitable open mesh material capable of filtering out the dust in the air which may be introduced either through the cowl ventilator opening 16 or the damper valve opening 45 in the upper part of said casing. Said filter plate is arranged so that it can be introduced through an open slot 51 formed in the front wall 22 of the inlet casing and is supported at its lateral margins by opposed upper and lower flanges 52, 53 mounted on the side walls of said casing (see Fig. 3). The arrangement is such that the plate can be removed bodily by withdrawing it rearwardly from the casing either for cleaning or replacement by a new filter element.

In the form shown herein, the damper valve 46 is interlocked with the means for controlling the cowl ventilator plate 17 so that said damper valve is automatically opened when the cowl ventilator plate 17 is closed, and vice versa. As shown in Figs. 4 and 5, the damper valve is provided with a pair of coil return springs 55 mounted at the ends of valve shaft 47. One end 56 of each of said springs engages a portion of the damper plate above its shaft, and the other end 57 of said spring is fixed to the adjacent side wall 23 of the casing as by passing therethrough as shown. The return springs 55 normally hold the damper plate in closed position excepting when the cowl ventilator is moved into closed position, in which case pick-up pins 58 carried by the cowl ventilator hinges 18 engage the upper edge of the plate and swing it into open position, as shown in Fig. 1. Thus in winter driving position shown in the latter figure, the cowl ventilator 16 is closed and the damper plate 46 is held in open position, and said plate is inclined forwardly and downwardly as shown. With this arrangement, when the hot water is turned on, and the heater fan 38 is in operation, air will be drawn from directly beneath the instrument board through the damper valve opening 45 into the inlet passage and be deflected downwardly by the valve plate 46 through the filter plate 50 and thence drawn through the heater element to be discharged at a higher temperature into the automobile body adjacent the floor. With this winter driving arrangement, therefore, the air within the car body is re-circulated and heated each time it passes through the heater, and at the same time the air is filtered as it passes through the inlet casing.

Referring now to the various optional arrangements for summer temperature conditions, I provide means particularly suitable for extreme hot weather where artificial cooling or refrigeration is desired without admitting any substantial amount of air from the exterior of the car body. In such case the hot water supply to the radiator core 32 of the heater is of course turned off, but in other respects the parts are left in the same position as shown for winter driving in Fig. 1, with the damper 46 open and the cowl ventilator 17 closed. In addition I also provide in the lower part of the inlet casing 21 an artificial cooling element, herein consisting of a perforated tray 60 spaced substantially below the filter plate 50 to form a cooling chamber 59, adapted to receive a quantity of artificial refrigerating material such as lumps of solidified carbon dioxide or "dry ice" which has been found particularly suitable for this purpose. A supply of such refrigerating material is introduced through an opening 61, herein disposed at one side of the casing 21 and closed by hinged door 62 as is best shown in Fig. 3. Circulation of air through the cooling chamber can be promoted and yet controlled to retard the evaporation of the cooling medium by means of the air fan 38, the speed of operation of which can be governed as usual through the conventional rheostat so as to maintain the temperature within the vehicle body at the desired point.

It will be noted further that the air cooled by the refrigerating material on pan 60 can also be supplied in whole or in part from the exterior of the car. As indicated in Fig. 2, the ventilator plate 17 can be moved from its fully open position shown in dotted lines, to a less open position shown in full lines, without engagement of the damper 46 by pins 58 associated with the ventilator plate operating mechanism so as to open said damper. Any further movement of the ventilator plate 17 toward its fully closed position, however, will open the damper plate 46. In other words, the proportion of fresh air to the amount of air being re-circulated within the car body can be readily controlled at will by those within the car so as to regulate the temperature therein, as desired.

Under more temperate summer driving conditions, the parts are preferably arranged substantially as shown in Fig. 2, in which the re-circulation valve opening 45 is closed by the damper plate 46 and the cowl ventilator plate 17 is open, as shown in full lines in this figure. In such case, of course, the hot water valve 36 to the heating element 30 is shut off, but no refrigerant or artificial cooling is used. While the car is in motion the air will usually be introduced in the cowl ventilator opening 16 under pressure sufficient to pass it through the filter plate 50 and be discharged into the car body, without the use of the air fan 38, but of course the latter can also be used, if desired. The amount of air supplied in this manner can also be controlled as usual by varying the inclined position of the ventilator plate 17, it being possible, of course, to vary the adjustment of said plate in several positions without opening the damper valve 46, excepting when the plate 17 is moved toward its fully closed position.

From the above description, it will now be understood that I provide an enclosed casing or air supply passage having an inlet leading from the usual cowl ventilator opening through a forced draft device such as an air fan and a heat exchange element (either a heater or a cooling device), and that said casing also has an opening leading from the interior of the car body.

With this arrangement, when operating either for heating in winter or cooling in summer, the ventilating system can be optionally arranged so that the air supply to the heat exchange element can be introduced from the outside through the cowl ventilator opening to displace the air in the car body, or the air within the closed car body can be re-circulated within the body. Fresh air from the outside can also be partially supplied, as determined at will by controlling the size of the cowl ventilator opening.

It will be observed further that when outside air is admitted through the cowl ventilator, it is drawn in under positive control of the forced draft means, instead of depending, as in the present conventional arrangement, upon the speed of movement of the car to force the air therein. My improved construction, therefore, is particularly effective in minimizing the substantial variations in temperature within the car body that are particularly noticeable under all driving conditions, when the speed of the car and its direction of movement relative to the wind, produce wide variations in the amount of air forced into the ventilator opening, for cooling, ventilating and heating.

Although I have shown and described one particular embodiment of my invention, it will be understood that I do not wish to be limited to the exact construction shown and described, but that various changes and modifications may be made without departing from the spirit and scope of my invention as defined in the appended claims.

I claim:

1. In an all-weather ventilating system for an automobile body having a ventilator opening and a cover plate therefor, a casing in the automobile body communicating directly with said ventilator opening to form an air inlet, a heat exchanger in said casing and forced draft means associated therewith, said casing also having a second air inlet opening communicating with the interior of the car body to afford recirculation of air within said body through said heat exchanger, a damper for the second inlet opening, manual control means connected with said cover plate and means associated with said damper and coacting with said control means for maintaining said damper closed when said cover plate is in a plurality of relatively wide open positions, but opening said damper when said cover plate is in a plurality of partially open positions adjacent to its fully closed position.

2. In an all-weather ventilating system for an automobile body having a ventilator opening and a cover plate therefor, a casing in the automobile body communicating directly with said ventilator opening to form an air inlet, a filter and a heat exchanger in said casing and forced draft means associated therewith, said casing also having a second air inlet opening communicating with the interior of the car body to afford recirculation of air within said body through said filter and heat exchanger, a damper for the second inlet opening, manual control means connected with said cover plate and means associated with said damper and coacting with said control means for maintaining said damper closed when said cover plate is in a plurality of relatively wide open positions, but opening said damper in inverse relation to the degree of opening of said cover plate when the latter is in a plurality of partially open positions adjacent its fully closed position.

3. In an all weather ventilating system for an automobile body having a ventilator opening and a cover plate therefor, a casing in the body communicating directly with said ventilator opening to form an air inlet, a heat exchanger in said casing and forced draft means associated therewith, said casing also having a second air inlet opening communicating with the interior of the car body to afford recirculation of air within said body through said heat exchanger, a damper for said second inlet opening, manual control means for said ventilator cover plate for moving the latter through a relatively wide range of open positions, means normally maintaining said damper in closed position, and stop means carried by said manual control means for engaging said damper and opening the latter when said cover plate is in a plurality of partially open positions adjacent its fully closed position.

4. In an all weather ventilating system for an automobile body having a ventilator opening and a cover plate therefor, a casing in the body communicating directly with said ventilator opening to form an air inlet, a filter and a heat exchanger in said casing and forced draft means associated therewith, said casing also having a second air inlet opening communicating with the interior of the car body to afford recirculation of air within said body through said filter and heat exchanger, a damper for said second inlet opening, manual control means for said ventilator cover plate for moving the latter through a relatively wide range of open positions, means normally maintaining said damper in closed position, and stop means carried by said manual control means for engaging said damper and opening the latter when said cover plate is in a plurality of partially open positions adjacent its fully closed position.

NILS ERIK WAHLBERG.